US011036715B2

(12) United States Patent
Jain et al.

(10) Patent No.: US 11,036,715 B2
(45) Date of Patent: Jun. 15, 2021

(54) COMBINATION OF TECHNIQUES TO DETECT ANOMALIES IN MULTI-DIMENSIONAL TIME SERIES

(71) Applicant: Microsoft Technology Licensing, LLC, Redmond, WA (US)

(72) Inventors: Varun Jain, Redmond, WA (US); Dmitri A. Klementiev, Redmond, WA (US); Igor Sakhnov, Sammamish, WA (US); Dinko Papak, Bellevue, WA (US); LeninaDevi Thangavel, Redmond, WA (US); Michail Zervos, Bellevue, WA (US); Dhruv Gakkhar, Bellevue, WA (US); Kateryna Boikovska, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 464 days.

(21) Appl. No.: 15/882,102

(22) Filed: Jan. 29, 2018

(65) Prior Publication Data

US 2019/0236177 A1 Aug. 1, 2019

(51) Int. Cl.
*G06F 16/23* (2019.01)
*G06F 17/18* (2006.01)
*G06F 16/2458* (2019.01)

(52) U.S. Cl.
CPC ...... *G06F 16/2365* (2019.01); *G06F 16/2474* (2019.01); *G06F 17/18* (2013.01)

(58) Field of Classification Search
CPC ............ G05B 23/0221; G05B 23/0235; G05B 23/0243; G06F 16/2365; G06F 16/2474; G06F 17/18; G06F 11/3452; G06N 20/00; G06N 7/00
See application file for complete search history.

(56) References Cited

U.S. PATENT DOCUMENTS

| 5,987,468 A | 11/1999 | Singh et al. |
| 7,433,527 B2 | 10/2008 | Takayama et al. |
| 8,577,649 B2* | 11/2013 | Suyama ............. G05B 23/0254 703/2 |
| 8,661,299 B1 | 2/2014 | Ip |
| 8,682,824 B2* | 3/2014 | Shibuya ............... G05B 23/021 706/45 |
| 8,924,333 B2 | 12/2014 | Biem |

(Continued)

OTHER PUBLICATIONS

"International Search Report and Written Opinion Issued in PCT Application No. PCT/US19/013723", dated Apr. 23, 2019, 15 Pages.

(Continued)

*Primary Examiner* — Merilyn P Nguyen
(74) *Attorney, Agent, or Firm* — Fiala & Weaver P.L.L.C.

(57) ABSTRACT

Methods, systems, apparatuses, and computer program products are described herein that enable detecting anomalies in time series. An anomaly detection technique is selected from a plurality of detection techniques, and is applied to a first time-series data set (having a first set of dimensions). In response to detecting an anomaly in the time-series data set, the anomaly detection technique is applied to a second time-series data set that is a subset of the first time-series data set. The first time-series data set includes the first set of dimensions plus one or more additional dimensions.

20 Claims, 7 Drawing Sheets

(56) References Cited

U.S. PATENT DOCUMENTS

| | | | |
|---|---|---|---|
| 10,733,813 B2* | 8/2020 | Ide | G06N 20/00 |
| 2008/0208526 A1* | 8/2008 | Thibaux | G06K 9/00536 |
| | | | 702/176 |
| 2012/0166142 A1* | 6/2012 | Maeda | G05B 23/0227 |
| | | | 702/185 |
| 2013/0080375 A1 | 3/2013 | Viswanathan et al. | |
| 2013/0110761 A1 | 5/2013 | Viswanathan et al. | |
| 2014/0039274 A1 | 2/2014 | Sarrafzadeh et al. | |
| 2014/0310235 A1 | 10/2014 | Chan et al. | |
| 2015/0169393 A1* | 6/2015 | Shibuya | G05B 23/0281 |
| | | | 702/182 |
| 2016/0042287 A1 | 2/2016 | Eldardiry et al. | |
| 2017/0147417 A1 | 5/2017 | Sasturkar et al. | |
| 2017/0206268 A1* | 7/2017 | Lee | G06F 16/287 |
| 2017/0364551 A1 | 12/2017 | Averbuch | |
| 2018/0039555 A1* | 2/2018 | Salunke | G06F 11/3034 |
| 2018/0219889 A1* | 8/2018 | Oliner | G06N 3/08 |
| 2018/0324199 A1* | 11/2018 | Crotinger | G06F 16/248 |
| 2018/0365571 A1* | 12/2018 | Rui | G06F 16/907 |
| 2020/0053110 A1* | 2/2020 | Wan | H04L 63/1425 |

OTHER PUBLICATIONS

Wang, et al., "Statistical 1,8 techniques for online anomaly detection in data centers", In Proceedings of 12th IFIP/IEEE International Symposium on Integrated Network Management (IM) and Workshops, May 23, 2011, pp. 385-392.

Kirpal, et al., "Machine Learning Anomaly Detection API", Retrieved From <<https://docs.microsoft.com/en-us/azure/machine-learning/team-data-science-process/apps-anomaly-detection-api>>, May 6, 2017, 13 Pages.

Nikovski, et al., "Anomaly Detection in Real-Valued Multidimensional Time Series", In Proceedings of ASE Bigdata/Socialcom/Cybersecurity Conference, May 27, 2014, pp. 1-9.

Prabhakaran, Selva, "Time Series Analysis", Retrieved From <<https://web.archive.org/web/20160310004232/http:/r-statistics.co/Time-Series-Analysis-With-R.html>>, Mar. 10, 2016, 14 Pages.

* cited by examiner

800

```
┌──────────────────────────────────────────────────────────────┐
│  Remove seasonality and trend data from the time-series data │ — 802
└──────────────────────────────────────────────────────────────┘
```

FIG. 8

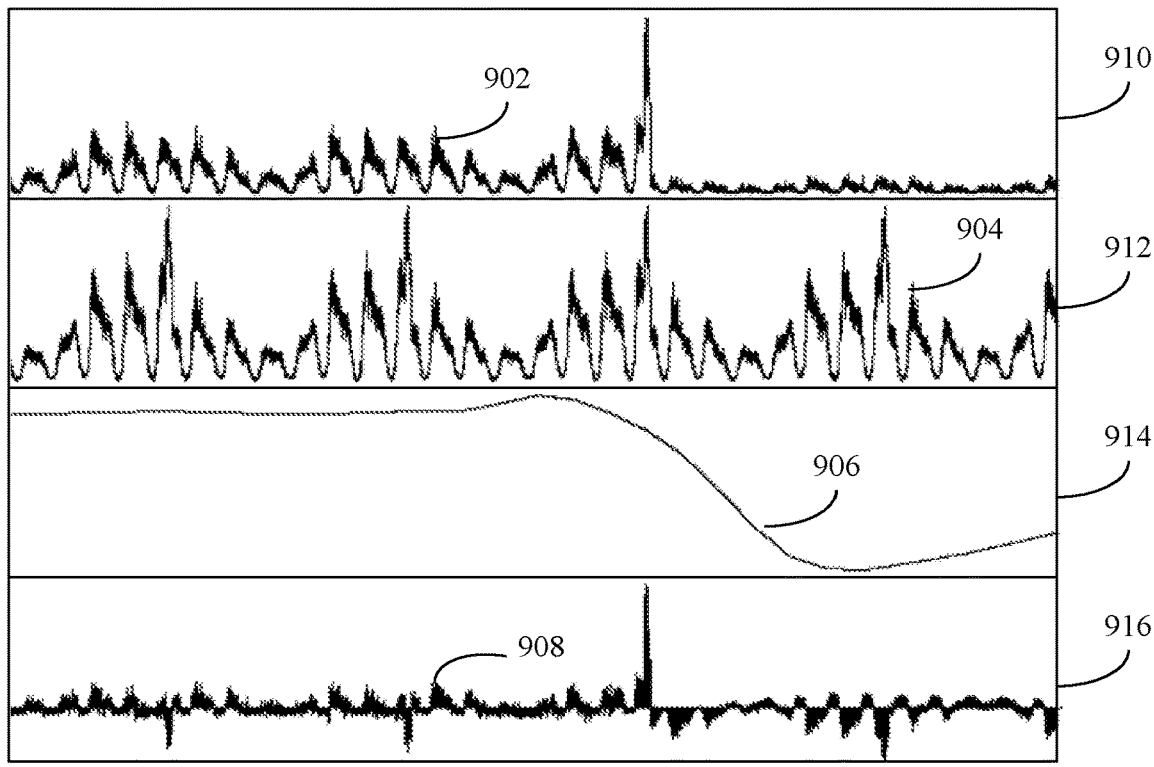

```
┌──────────────────────────────────────────────────────────────┐
│ Iteratively apply the selected detection technique to the    │
│ time-series data for further sets of dimensions of the       │ — 1002
│ time-series data to iteratively re-detect the anomaly        │
└──────────────────────────────────────────────────────────────┘
```

FIG. 10

COMBINATION OF TECHNIQUES TO DETECT ANOMALIES IN MULTI-DIMENSIONAL TIME SERIES

BACKGROUND

Time series data is a sequence of data points indexed in time order. Typically, the data points of time series data are captured at equally-spaced time intervals. Time series data may be captured in any type of system, and for any type of metric that varies over time, including stock exchange stock values, temperatures, population size, the number of sunspots, error counts, etc. The time series data may include captured data corresponding to numerous attributes, where each attribute has multiple possible values (e.g., GE stock, Boeing stock, etc.), with which the time series data may be correlated. Such attributes may be referred to as "dimensions."

Time series data may be analyzed to determine "anomalies," which are data points having values that deviate substantially from the values of the majority of the time series data points. Anomalies in time series data may correspond to system problems or other topics of interest. Thus, analysis of time series data, including the correlating of anomalies to particular dimensions and dimension values, is useful in detecting and correcting such problems. The number of dimensions and their possible values, can be very large, such as thousands of dimensions and/or thousands of corresponding dimension values, leading to a great deal of time-consuming analysis being performed to detect an anomaly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that enable detecting anomalies in time series. An anomaly detection technique is selected from a plurality of detection techniques, and is applied to a first time-series data set for a set of dimensions. In response to detecting an anomaly in the time-series data set, the anomaly detection technique is applied to a second time-series data set, which is a subset of the first time-series data set, for one or more additional dimensions.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiments and to enable a person skilled in the relevant art(s) to make and use the embodiments.

FIG. 8 depicts a flowchart of a method for removing seasonality and trend data from time-series data, in accordance with an embodiment.

FIG. 9 depicts seasonal and trend decomposition of a time-series signal, in accordance with an embodiment.

FIG. 10 depicts a flowchart of a method for iteratively applying a selected detection technique to redetect an anomaly, in accordance with an embodiment.

Figure 1:
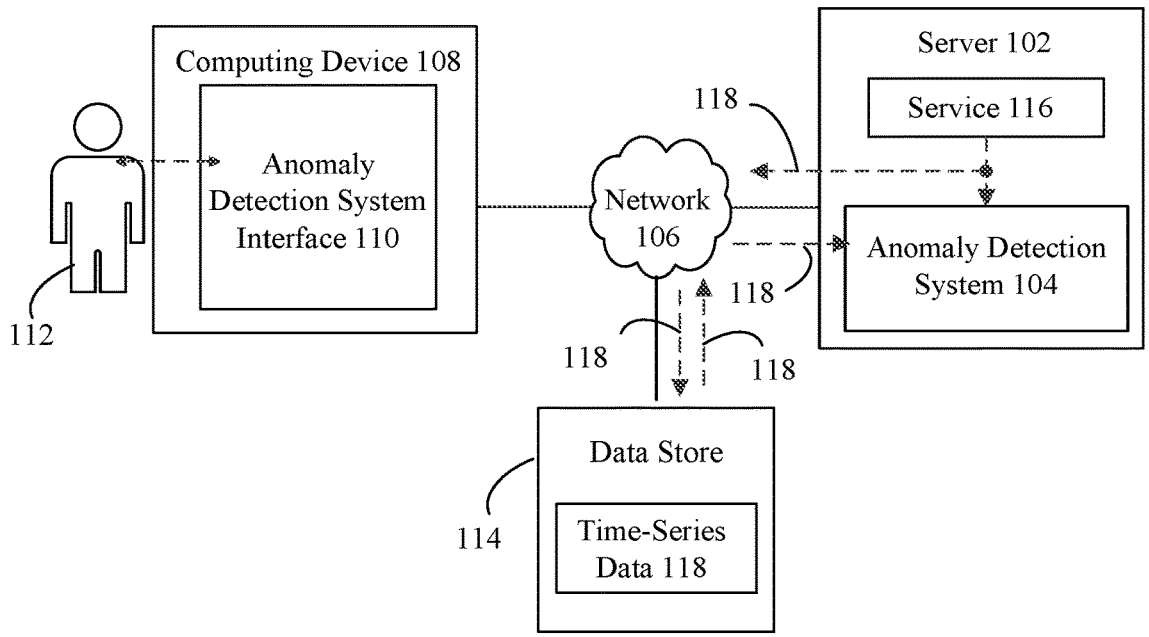
FIG. 1 is a block diagram of an example system that enables detection of an anomaly in time-series data and interaction of a user with the anomaly detection system, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Time series data is a sequence of data points indexed in time order, typically captured at equally-spaced time intervals. Time series data may be captured in any type of system, and for any type of metric that varies over time, including stock exchange stock values, temperatures, population size, the number of sunspots, error counts, etc. In one example, time series data can be used to monitor the behavior and ensure resiliency of a cloud software service/system. For instance, time series data may be captured to determine and analyze various cloud service metrics over time, such as service errors, downtime, packet errors, etc. The time series data may include captured data corresponding to numerous cloud service attributes, such as data center, server, error code, etc., where each attribute has multiple possible values (e.g., data center 972, data center 973, error code 100, error code 101, etc.), with which the time series data may be correlated. Such attributes may be referred to as "dimensions," and the time series data set itself may be referred to as a multi-dimensional time series. A multi-dimensional time series can be visualized as many two-dimensional time series, where each time series represents the same metric, but for different system attributes (dimensions).

Time series data may be analyzed to determine "anomalies," which are data points having values that deviate substantially from the values of the majority of the time series data points. Anomalies in time series data may correspond to performance issues (e.g., a particular server having a substantially greater number of errors than other servers in a data center) for potential correction. An example system where anomaly detection is useful is a distributed software services system, where many components run tasks independently, but may appear to end users as a single service. Such distributed services generate a large amount of logs/metrics, which can be converted to time series in which anomalies can be detected to monitor the behavior of the service and ensure resiliency of the service. Such a distributed service may include a large number of servers, applications, tenants, etc., which can each be considered a dimension against which anomalies may be desired to be correlated.

Thus, analysis of time series data, including the correlating of anomalies to particular dimensions and dimension values, is useful in detecting and correcting performance issues. A problem with multi-dimensional time series is cardinality. The number of dimensions and their possible values, can be very large, such as thousands of dimensions and/or thousands of corresponding dimension values, leading to a great deal of time-consuming analysis being performed.

For instance, to determine which users (a user dimension) of applications (an application dimension) provided by a cloud service were impacted by an anomaly, where there are a thousand applications and a thousand users of the applications, a time-series is analyzed for each value combination of the user and application dimensions, which is a million time-series (1,000×1,000). Applications often have millions of users. Detecting how many users were impacted by anomaly for a particular error code, where there are a thousand applications and a million users, entails analyzing a billion time series (1,000×1,000,000). Correspondingly, detecting how many users of the applications were impacted by an anomaly for several errors, entails analyzing several billion time series. Analyzing billions of time series is inefficient and computationally difficult or even impossible for some systems analyzing the time series.

Moreover, multi-dimensional time series may require different detection techniques to detect an anomaly because data for each time series may have different characteristics (e.g., data may be a constant value, include noise, or include periodic data, etc.). Determining which detection technique to apply to each time series of billions of time series is also inefficient and time consuming.

Accordingly, example embodiments described herein are directed to techniques that enable detecting anomalies in operational and performance metrics (e.g., error count, user traffic, central processing unit (CPU) usage) of a cloud software service by selecting and applying an anomaly detection technique from a plurality of detection techniques to time-series data sets for different combinations of dimension values of one or more dimensions of the time-series data.

As used herein, the term "time series" broadly refers to a chronologically ordered sequence of data points. Time-series data can be visually represented as a two-dimensional graph. For example, a line graph may plot values of a metric against time, where time is represented on a horizontal axis (e.g., x-axis) and potential values of the metric are represented on a vertical axis (e.g., y-axis). Further, as used herein, the term "anomaly" broadly refers to a deviation of a metric from standard, normal, or expected behavior. An anomaly in time-series data may be observed as a spike, a dip, or a persistent spike or dip in a line graph, etc.

Additionally, as used herein, the term "dimension" broadly refers to a category or type of data that the time-series data belongs to and "dimension value" broadly refers to a sub-unit within the broader category or type. For instance, in a cloud software service context, a dimension of time-series data may be "Datacenter" and dimension values of the Datacenter dimension may include the locations, names, assigned code values, etc. of datacenters in which a service is distributed across. As another example, a dimension of time-series data may be "Tenants" and the dimension values of the tenant dimension may include the names of entities or organizations that use an application provided by a service.

Note that as described above embodiments are applicable to any type of system in which time series may be generated. One example system is a "cloud" application or service in a network architecture/platform. A cloud platform includes a networked set of computing resources, including servers, routers, etc., that are configurable, shareable, provide data security, and are accessible over a network such as the Internet. Cloud applications run on the resources, often atop operating systems that run on the resources, for entities that access the applications over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

A multi-dimensional time series can be visually depicted as several two-dimensional time-series, where each time series represents the same metric over intervals of time but for different combinations of dimension values. For example, several time series can be used to monitor CPU usage of machines in a software service distributed across different machines. In this scenario, each machine running tasks for the service will have a time series indicating CPU usage at discrete points in time. Alternatively, a machine running two or more applications provided by service may have a time series indicating CPU usage for each application running on the machine. Any anomaly in CPU usage for a machine is observable in a line graph of CPU usage versus time as a spike or a dip. The data points of the time series of the multiple dimensions can be combined to form the multi-dimensional time series collectively.

Further embodiments are described in detail in the following subsections. For instance, the next subsection describes exemplary method and system embodiments for detecting anomalies. The subsequent subsection describes anomaly detection techniques and embodiments for their selection, followed by a subsection describing embodiments for filtering time series data, a subsection describing embodiments for iterating anomaly detection over increasing dimensions, and a subsection describing user interface embodiments for configuring anomaly detection and presenting time series data in plot form. The embodiments disclosed in these subsections may be combined with each other and any other embodiments disclosed herein.

A. Exemplary Embodiments for Anomaly Detection in Time Series

Embodiments described herein address one or more of the above-mentioned issues in analyzing multi-dimensional time series by providing a set of straightforward anomaly detection techniques for automatic selection and application to any type of time series, and reducing the number of time series that need to be analyzed to detect anomalies. To further help illustrate the foregoing, FIG. 1 is described. In particular, FIG. 1 is a block diagram of an example communication system 100 that enables detection of anomalies in time-series data and enables interaction of a service owner with the anomaly detection system, according to an example embodiment.

As shown in FIG. 1, system 100 includes a server 102, a computing device 108, and a data store 114. A network 106 communicatively couples server 102, computing device 108, and data store 114. Server 102 includes an anomaly detections system 104 and a service 116, and computing device 108 includes an anomaly detection system interface 110. System 100 is described in further detail as follows.

Server 102 may include one or more server devices and/or other computing devices. Computing device 108 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Data store 114 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Server 102 and computing device 108 may include at least one wired or wireless network interface that enables communication with each other and data store 114 (or an intermediate device, such as a Web server or database server) via network 106. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 106 include a local area network (LAN), a wide area network (WAN), a personal area network (PAN), and/or a combination of communication networks, such as the Internet.

Service 116 in server 102 may comprise any type of network-accessible service that provides one or more applications to end users, such as a database service, social networking service, messaging service, financial services service, news service, search service, productivity service, cloud storage and/or file hosting service, music streaming service, travel booking service, or the like. Examples of such services include but are by no means limited to a web-accessible SQL (structured query language) database, Salesforce.com™, Facebook®, Twitter®, Instagram®, Yammer®, LinkedIn®, Yahoo! ® Finance, The New York Times® (at www.nytimes.com), Google™ search, Microsoft® Bing®, Google Docs™, Microsoft® Office 365, Dropbox®, Pandora® Internet Radio, National Public Radio®, Priceline.com®, etc. Although FIG. 1 shows service 116 and anomaly detection system 104 both located in server 102, in other embodiments, service 116 and anomaly detection system 104 may be located in different, separate servers.

Anomaly detection system 104 is configured to receive and analyze time-series data 118 for anomalies. For example, anomaly detection system 104 may receive time-series data 118 collected for service 116 directly from service 116 and/or from data store 114 via network 106. Time-series data 118 may be collected during execution of service 116 and stored remotely in data store 114 and/or locally in memory of server 102. Time-series data 118 may include operational and performance metrics for service 116. Alternatively, anomaly detection system 104 is configured to receive data for service 116 that needs to be converted to time-series data 118 and to convert the received data to time-series data 118.

Anomaly detection system 104 is configured to select from a plurality of detection techniques a detection technique for detecting an anomaly in time-series data 118 and to apply the selected detection technique to time-series data 118 to detect an anomaly. For example, as is discussed in further detail herein, anomaly detection system 104 may divide time-series data 118 into multiple portions, where a first portion is the time-series data captured during an earlier time period ("historical data") and a second portion is the time-series data captured in a recent time period that includes being captured in real-time ("current data"). The first portion is used as historical data. Based on the characteristics of the historical data, a detection technique is selected. The second portion is analyzed and/or compared to the first portion of time-series data 118 according to the selected detection technique to detect an anomaly.

In embodiments, one or more service owners may be enabled to interact with anomaly detection system 104. For example, a user 112, such as an owner or administrator of service 116 or other user, may interact with anomaly detection system 104 over network 106 via anomaly detection system interface 110 at computing device 108. User 112 may instruct anomaly detection system 104 to analyze a particular time period (e.g., the last week, a month prior, a last year) of time-series data 118, to query a particular database storing time-series data 118, and/or filter out particular portions of time-series data 118 via anomaly detection system interface 110. Anomaly detection system interface 110 may include any number of user interface elements/controls (e.g., graphical user interface (GUI)), including buttons, keyboards, keypads, touchpads, menus, text boxes, check boxes, etc. for inputting instructions or configurations for anomaly detection system 104. Anomaly detection system interface 110 may be implemented in a web browser (e.g., as a web page), as a desktop application, as a mobile application (e.g., an app), or in any other suitable form.

Note that although FIG. 1 shows anomaly detection system 104 and anomaly detection system interface 110 in separate computing devices, in another embodiment, anomaly detection system 104 and anomaly detection system interface 110 may be included in a same device (e.g., computing device 108 or server 102).

Figure 2:
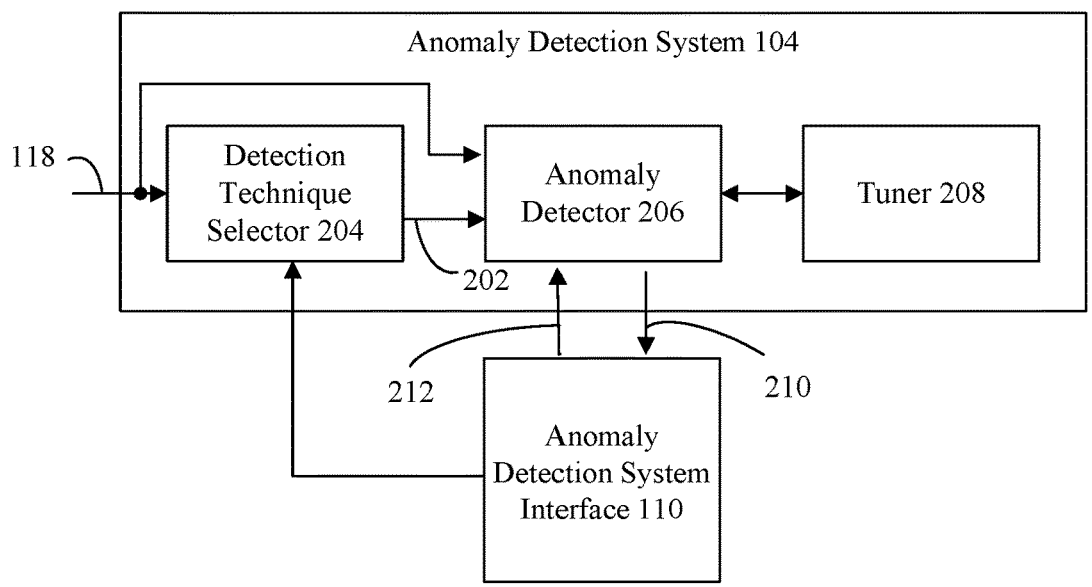
FIG. 2 is a block diagram of an example computing system including an anomaly detection system, according to an example embodiment.

Anomaly detection system 104 may be configured in various ways to perform its functions. For instance, FIG. 2 shows a block diagram of anomaly detection system 104 in a computing system 200, according to an example embodiment. FIG. 2 is described with continued reference to FIG. 1. As shown in FIG. 2, anomaly detection system 104 includes a detection technique selector 204, an anomaly detector 206, and a tuner 208, and anomaly detection system interface 110 is communicatively coupled to detection technique selector 204 and anomaly detector 206. The features of system 200 are described in further detail as follows.

As shown in FIG. 2, detection technique selector 204 is configured to receive time-series data 118, to based thereon, to select from a plurality of detection techniques a detection technique for detecting an anomaly in the time-series data. Detection technique selector 204 is configured to provide the selected detection technique to anomaly detector 206 as selected detection technique 202. In an embodiment, detection technique selector 204 may receive data for conversion to time-series data 118, may convert the data, and may provide the converted time-series data to anomaly detector 206.

Anomaly detector 206 is configured to apply the selected detection technique of selected detection technique 202 to time-series data 118 to detect an anomaly in the time-series data. Anomaly detector 206 is further configured to provide an indication of a detected anomaly to anomaly detection system interface 110 as detected anomaly 210. As shown in FIG. 1, user 112 of service 116 may view detected anomaly 210 presented in anomaly detection system interface 110. In an embodiment, detected anomaly 210 may include data that enables interface 110 to generate and display a line graph of an operational metric of service 116 plotted versus time, indicating the anomaly. For instance, the anomaly may be observed as a spike or a dip in the value of the metric in the line graph. In yet another embodiment, detected anomaly 210 may include a textual notification indicating a time at which the anomaly occurred in time-series data 118.

Tuner 208 is configured to adjust a sensitivity of anomaly detector 206 used when detecting anomalies. For example, tuner 208 may automatically adjust one or more sensitivity levels of anomaly detector 206 based on determining that an indicated anomaly in time-series data by anomaly detector 206 is not an actual anomaly. As another example, tuner 208 may automatically adjust one or more sensitivity levels of anomaly detector 206 based on determining that anomaly detector 206 is failing to detect all anomalies in time-series data. Alternatively, user 112 may adjust one or more sensitivity levels via anomaly detection system interface 110 of anomaly detector 206 in response to determining that an indication of an anomaly includes an anomaly that is not considered an anomaly for service 116 by user 112. Further, user 112 may adjust one or more sensitivity levels of anomaly detector 206 in determining that anomaly detector 206 is not detecting anomalies in time-series data for service 116 that user 112 considers to be an anomaly. The adjustment of sensitivity levels may include adjusting a threshold level to be greater or lower, adjusting a time duration of anomalous data points that constitutes an anomaly (e.g., filtering out anomalous data that occurs over a shorter duration), etc.

Figure 3:
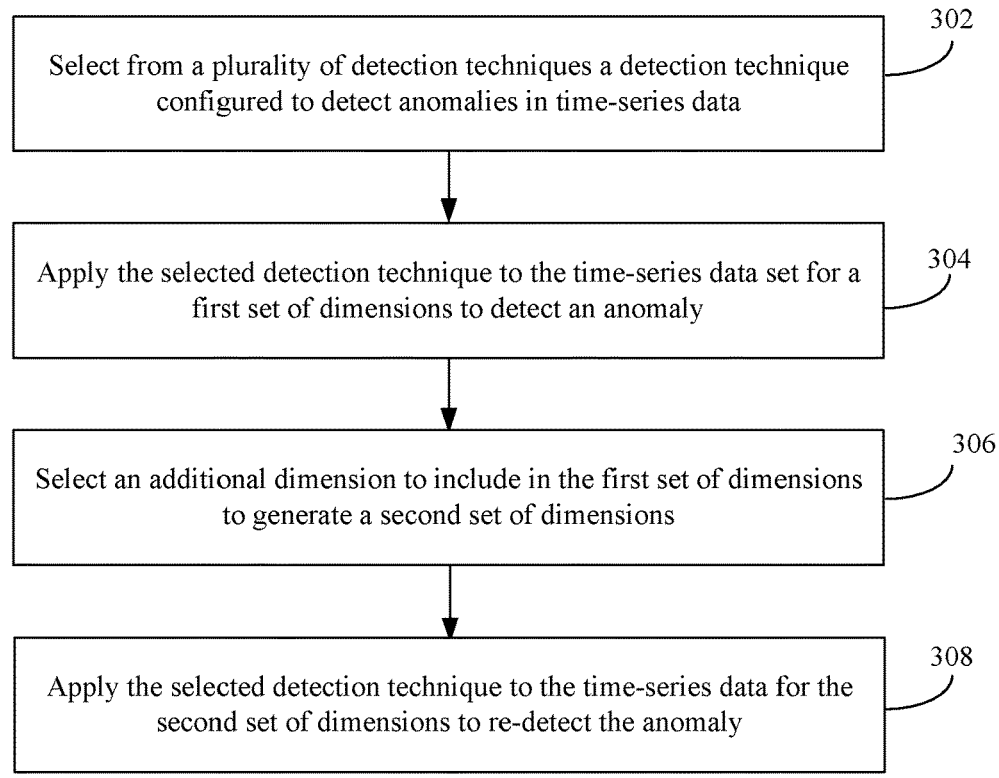
FIG. 3 depicts a flowchart of a method for selecting a detection technique and applying the detection technique to time-series data to detect an anomaly, in accordance with an embodiment.

Anomaly detection system 104 may operate in various ways to perform its functions. For instance, FIG. 3 depicts a flowchart 300 of a method for selecting a detection technique and applying the detection technique to time-series data to detect an anomaly, according to an example embodiment. FIG. 3 is described with continued reference to FIGS. 1 and 2. However, other structural and operational embodiments will be apparent to persons skilled in the relevant art(s) based on the following discussion regarding flowchart 300 and systems 100 and 200 of FIGS. 1 and 2.

As shown in FIG. 3, flowchart 300 begins at step 302. In step 302, a detection technique configured to detect anomalies in time-series data is selected from a plurality of detection techniques. For example, and with continued reference to FIGS. 1 and 2, detection technique selector 204 of anomaly detection system 104 may automatically select a detection technique to detect anomalies in time-series data 118 for multiple dimensions based on historical data of the time-series data. To help further illustrate, a first portion of the time-series data may be designated as historical data. The designated historical time-series data is analyzed (e.g., an average and/or standard deviation of the time-series data is calculated) and based on the characteristics of the time-series data analyzed a detection technique is selected from the plurality of detection techniques. Any anomaly detection techniques may be present that are selected from. Examples of anomaly detection techniques include a zero-threshold technique, an average percent technique, and a standard deviation technique, which are described in further detail further below.

In an embodiment where standard deviation, average percent, and zero-threshold detection techniques are available, detection technique selector 204 may perform a process to select which of the three detection techniques to apply. For example, if the historical portion of the time-series data has an average value of approximately zero and a standard deviation of approximately zero, the zero-threshold technique is selected. If the historical portion of the time-series data has a significant average (e.g., greater than zero) and a standard deviation of approximately zero, the average percent technique is selected. If the historical portion of the time-series data has a significant standard deviation (e.g., greater than zero), the standard deviation technique is selected. To select a particular technique, detection technique selector 204 may assess these three techniques for application in parallel or in series in any order (e.g., the order of (a) assessing whether standard deviation exists in the time-series data; if yes, selecting the standard deviation detection technique; if not, (b) assessing whether average exists in the time-series data; if yes, selecting the average percent detection technique; if not, (c) selecting the zero-threshold detection technique). In accordance with certain embodiments, user 112 may designate a particular period of the time-series data as historical data.

In step 304, the selected detection technique is applied to the time-series data set for a first set of dimensions to detect an anomaly. For example, and with continued reference to FIGS. 1 and 2, anomaly detector 206 of anomaly detection system 104 applies selected detection technique 202 to time-series data 118 for a first set of dimensions to detect an anomaly. For instance, selected detection technique 202 may be applied to a current portion of current time-series data. The first set of dimensions of time-series data 118 to which selected detection technique 202 is applied may be automatically selected by anomaly detector 206, or manually selected by a user, such as by interaction with anomaly detection system interface 110. For instance, as shown in FIG. 2, configuration data 212 may be provided from interface 110 to anomaly detector 206. Configuration data 212 includes configuration information for executing anomaly detection by anomaly detector 206, such as the first set of dimensions.

As described above, various anomaly detection techniques may be selected and performed, including the zero-threshold technique, average percent technique, or the standard deviation technique. In an embodiment, if the zero-threshold technique is selected, the zero-threshold detection technique is applied to each data point of the second portion of the time series data by comparing the value of the data point to a predetermined threshold. If a value of the data point is equal to or above the predetermined threshold, an anomaly is detected. For data point values below the predetermined threshold, an anomaly is not detected.

In another embodiment, if the average percent technique is selected, the average percent detection technique is applied by determining, for each data point of the second portion, a percentage change in its value from an average value of the first portion. If the percentage change is equal to or greater than a predetermined threshold percentage value, an anomaly is detected for the data point. For values of the second portion of the time-series data having percentage changes below the predetermined threshold percentage value, an anomaly is not detected for the data point.

In yet another embodiment, if the standard deviation technique is selected, the selected detection technique may be applied by first removing seasonal and trend data from the time-series data to produce residual time-series data. A standard deviation is calculated for a historical portion of the time series data, and for each data point of the current portion. The historical standard deviation is compared to the standard deviation calculated for each data point. If a difference between the historical and data point standard deviations is equal to or greater than a predetermined value, an anomaly is detected for the data point. If the difference is less than a predetermined value, an anomaly is not detected for the data point. Note that a user may elect to maintain seasonal and trend in the time-series data. As such, in an embodiment, anomaly detection system interface 110 may include an interface control that enables a user to choose to not remove seasonality and trend from the time-series data and/or to choose to have the seasonality and trend removed from the time-series data.

One or more standard deviation techniques can be applied to detect anomalies in this case. For example, a standard deviation technique that assigns a normalized score between 0 and 1 when a data point is considered as normal or anomalous, respectively. In an embodiment, each of the zero threshold, average percent, and standard deviation detection techniques may generate a score between 0 and 1 for each data point, indicating a range between normal to anomalous. For instance, for zero threshold detection technique, if the data point is greater than the selected predetermined threshold, as score of 1 is assigned to the data point. Otherwise, the data point is assigned 0. Similarly, for the average percent detection technique, the score increases gradually from 0 to 1 as the data point becomes increasing greater than the predetermined average percentage threshold value. A way to assign a score between 0 and 1 in the standard deviation based technique is to consider a normal distribution, and calculate the Gaussian of the historical data. Then, the value of a data point is located on the Gaussian curve, with a factor of sensitivity being added. An anomaly is detected in the time-series data at a time value having an associated data value that is beyond a predetermined value with reference to the normal distribution of historical data. A higher sensitivity value may be selected (e.g., by the user or automatically) to detect greater numbers of anomalies, while a lower sensitivity leads to the detection of fewer number of anomalies. This combination of techniques ensures that anomalies are detected in all different kinds of time series using a same configuration of parameters for the given multi-dimensional group of time series. A persistency parameter may be used to enable an option to discard a single spike or a single dip as noisy data, and to consider a spike or dip as an anomaly only if it is persistent.

Figure 5:
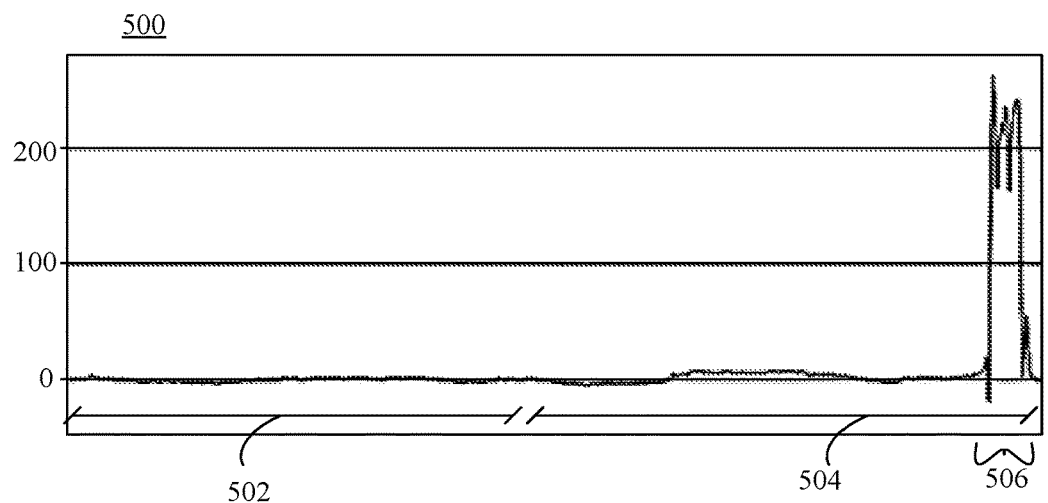
FIG. 5 depicts an example plot of time-series data appropriate for a zero-threshold anomaly detection technique, in accordance with an embodiment.
Figure 6:
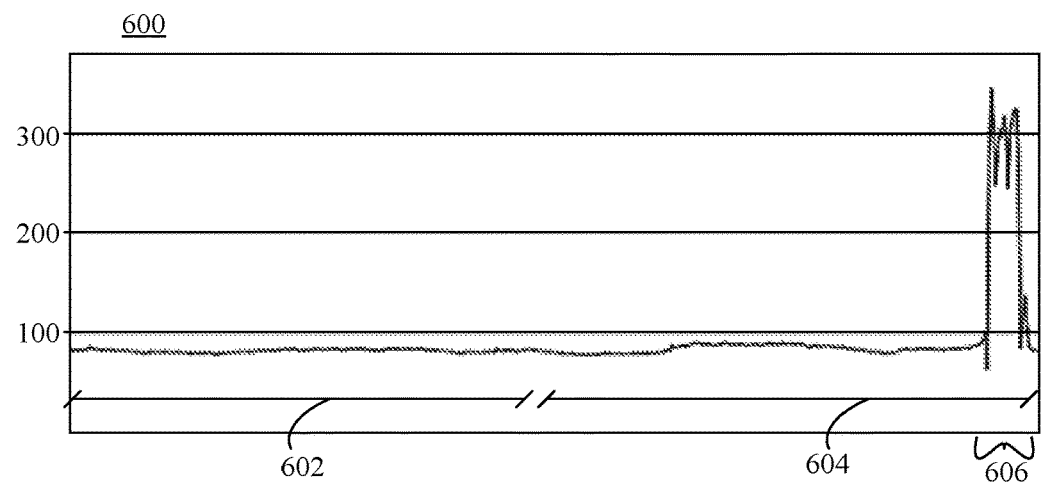
FIG. 6 depicts an example plot of time-series data appropriate for an average percent anomaly detection technique, in accordance with an embodiment.
Figure 7:
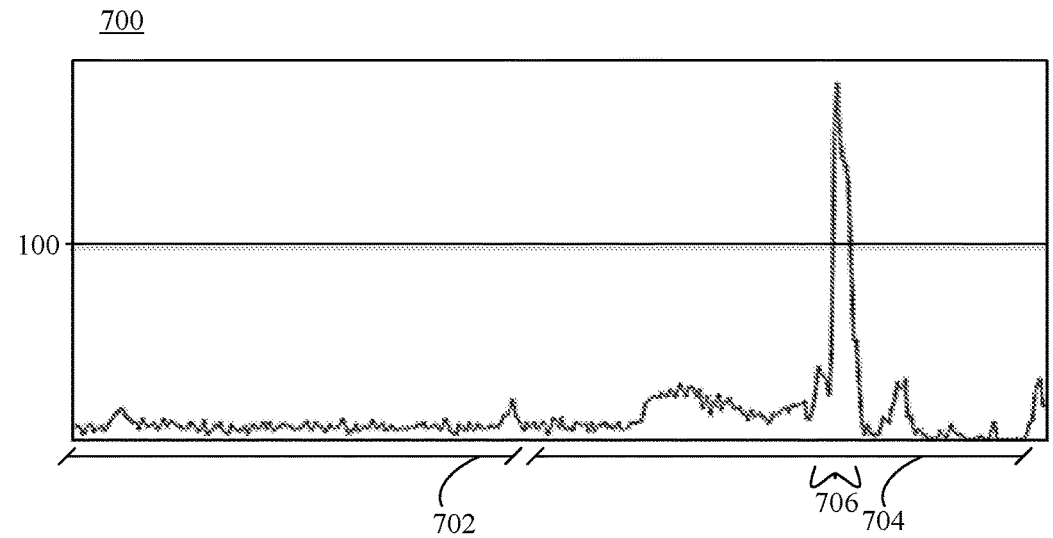
FIG. 7 depicts an example plot of time-series data appropriate for a standard deviation anomaly detection technique, in accordance with an embodiment.

Note that the zero-detection, average percent, and standard deviation detection techniques are discussed in further detail herein with reference to FIGS. 5-7.

In step 306, an additional dimension is selected to include in the first set of dimensions to generate a second set of dimensions. For example, and with continued reference to FIGS. 1 and 2, anomaly detector 206 may automatically select an additional dimension to include in the first set of dimensions to generate a second set of dimensions. For instance, the first set of dimensions may include time-series data for dimensions "Error Codes" and "Applications." If the additional dimension selected is "Tenant", the second set of dimensions would include time-series data for the dimension set of the "Error Code", "Applications", and "Tenants" dimensions. Note that in another embodiment, rather than detection technique selector 204 selecting the additional dimension(s), a user may interact with interface 110 to select the additional dimension(s), which may be provided to anomaly detector 206 in configuration data 212. Furthermore, as described in further detail below, anomaly detector 206 and/or the user (at interface 110) may select one or more dimension values to include and/or to exclude in the anomaly detection performed by anomaly detection 206 in step 306.

In step 308, the selected detection technique is applied to the time-series data for the second set of dimensions to re-detect the anomaly. For example, and with continued reference to FIGS. 1 and 2, anomaly detector 206 of anomaly detection system 104 applies the selected detection technique to the time-series data for the second set of dimensions to re-detect the anomaly using the approaches described in step 304 for each detection technique.

One advantage provided by the flowchart 300 is that the number of time-series data sets analyzed by anomaly detector 206 to detect anomalies may be reduced. In particular, in step 308, detection of anomalies may be performed by on the time series data for a second set of dimensions that includes at least one additional dimension, but that eliminates dimension values of at least one of the dimensions of the first set of dimensions (analyzed in step 304). By eliminating the dimension values, the overall number of time series data sets is reduced.

To illustrate, a detection technique may be applied by anomaly detector 206 to a time-series data set corresponding to each combination of dimension values for a first set of dimensions including: Application (with dimension values A1 and A2) and Error Code (with dimension values of E1, E2, and E3). In response to detecting an anomaly in a time-series data set corresponding to the combination of dimension values of A1E1 (from six possible combinations: A1E1, A1E2, A1E3, A2E1, A2E2, and A2E3), an additional dimension of "Tenant" (e.g., consisting of a hundred tenants from T1 to T100) may be selected to be included in a second set of dimensions. Furthermore, the dimension values of A1E2, A1E3, A2E1, A2E2, and A2E3 may be eliminated, because no anomalies were detected for these dimension values, and thus there is no need to again analyze them for anomalies Instead, subsequent analysis can focus on the combination of dimension values A1E1 (e.g., instances of error code 1 occurring at application 1). As such, the detection technique may be applied to time-series data corresponding to each combination of dimension values for the second set of dimensions. In the current example, the analyzed dimension set includes Application A1, Error Code E1 and Tenant T1-T100 (e.g., A1E1T1, A1E1T2 . . . A1E1T100) (100 time series), which corresponds to significantly fewer time series data sets than all combinations of Applications A1 and A2, Error Codes E1, E2, and E3, and Tenants T1-T100 (600 times series).

By analyzing a smaller set of dimensions first, the number of time-series data sets needed to be analyzed in order to detect anomalies for all combinations of dimension values is reduced. Subsequently, the number of dimensions may be increased while eliminating some of the dimension values of the prior dimensions, to focus more closely on the source of the anomalies, which may more easily be determined based on the reduced dimension. In the example above, in two iterations of detection, a total of 106 time-series data sets are processed to detect anomalies (e.g., in step 304, six time-series data sets, and in step 308, a hundred time-series data sets), instead of performing the detection over all six hundred time-series data sets. Accordingly, time, processing power, and memory are all conserved using the process of flowchart 300 relative to conventional techniques. Note that further increases in the number of dimensions may be performed in flowchart 300 (e.g., iterating steps 306 and 308) to further hone in on the source of anomalies.

Figure 4:
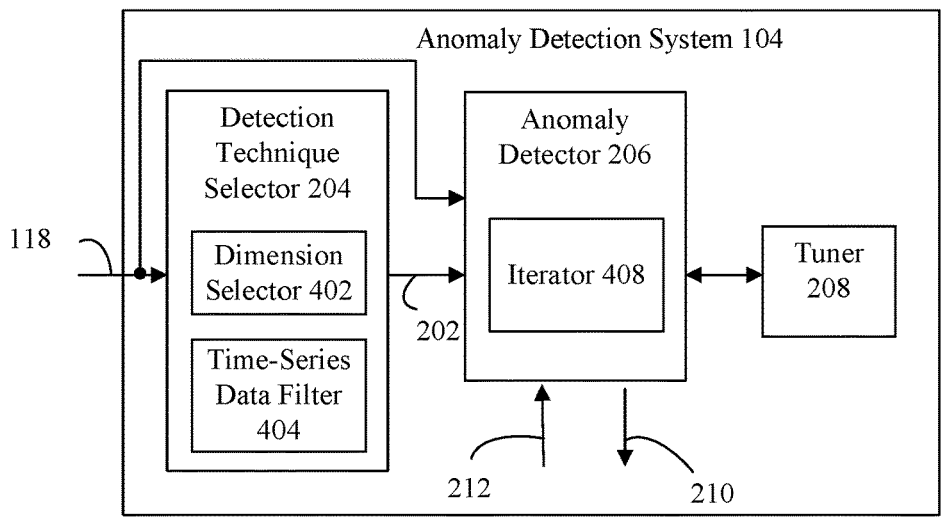
FIG. 4 is a block diagram of a further example anomaly detection system, in accordance with an embodiment.

FIG. 4 shows a block diagram of further detail of anomaly detection system 104 in a computing system 400, according to an example embodiment. FIG. 4 is described with continued reference to FIGS. 1-3. System 400 is an example embodiment of system 200 in FIG. 2. As shown in FIG. 4, detection technique selector 204 includes a dimension selector 402 and a time-series data filter 404, and anomaly detector 206 includes an iterator 408. The features of system 400 are described in further detail as follows.

Dimension selector 402 may be included in detection technique selector 204 as shown in FIG. 4, or may be included in anomaly detector 206. Dimension selector 402 is configured to select the dimensions to include in a set of dimensions corresponding to the time series for anomaly detector 206 to analyze for anomalies. Accordingly, dimension selector 402 may select an initial set of dimensions (e.g., used in step 304 of FIG. 3) and may select additional dimensions to add to the set (e.g., step 306 of FIG. 3). Anomaly detector 206 is configured to detect anomalies by sequencing through the time series corresponding to the selected set of dimensions. In an embodiment, anomaly detector 206 may iterate through all of the time series corresponding to all combinations of dimension values of the dimensions of the set. In another embodiment, dimension selector 402 may select a subset of dimension values of the dimensions for analysis by anomaly detector 206. The subset of dimension values may exclude dimension values, including dimension value combinations, determined to not include anomalies, as described above. In an alternative embodiment, user 112 may interact with interface 110 (FIG. 2) to select dimensions of the dimension set, as well as to additional dimension, and the selected dimension set is provided in configuration data 212 to anomaly detector 206. Furthermore, user 112 may interact with interface 110 to select a subset of dimension values of the dimensions for analysis by anomaly detector 206.

Time-series data filter 404 is configured to filter time-series data 118. For example, a user may indicate what particular time-series data of a time series data set to include in an analysis before a detection technique is selected and applied to time-series data 118 in steps 302 and 304 of FIG. 3. For instance, as described above with reference to FIG. 1, user 112 may instruct time-series data filter 404 to analyze a particular time period (e.g., a last week, a month prior, a last year) of time-series data, to query a particular database storing time-series data, and/or filter out particular time-series data via anomaly detection system interface 110. In other embodiments, time-series data filter 404 may automatically filter time-series data based on anomalies being detected. In another embodiment, time-series data filter 404 may be configured to pre-process time series data 118 for anomaly detection, such as by filtering out seasonality, trend, and/or other unneeded and/or undesired attributes of time series data 118.

Iterator 408 is configured to iteratively apply a selected detection technique to time-series data sets for each combination of values of a set of dimensions of time-series data. In other words, iterator 408 may repeat steps 306 and 308 of flowchart 300 any number of times, such as to hone in on more specific time series data corresponding to more specific systems and/or processes that may be experiencing the anomalies. To illustrate, iterator 408 may cause anomaly detector 206 to continue to apply anomaly detector 206 to a time-series data set corresponding to each combination of dimension values for a set of dimensions including: Application (with dimension values A1 and A2) and Error Code (with dimension values of E1, E2, and E3), and/or any further dimensions and/or dimension values. For example, in response to detecting an anomaly in a time-series data set corresponding to the combination of dimension values of A1E1, an additional dimension of "Tenant" (consisting of a hundred tenants from T1 to T100) may be selected to be included in a second set of dimensions, while A1E2, A1E3, A2E1, A2E2, and A2E3 are excluded dimension values. Accordingly, the detection technique may be applied to time-series data sets corresponding to each combination of dimension values for the second set of dimensions (for example, A1E1T1, A1E1T2 A1E1T100).

An example anomaly detection scenario is described as follows for purposes of illustration. In this scenario, an anomaly is searched for in a number of requests to a service provided from different tenants. This is a single scenario but with different kind of tenants, corresponding to different kinds of time series. However, the above described combination of detection techniques is applied to find anomalies in all kinds of time series in this scenario. The requests are measured per minute per tenant. There are different kinds of tenants: 1. new tenants, 2. automated tenants, and 3. human tenants. New tenants will have no requests in the past and start sending requests to different tenants. The service owner wants to detect when any new tenant sends at least 100 requests in a minute. Automated tenants mostly have same number of requests per minute, no matter the time of the day or day of the week. The service owner wants to detect when such tenants see a sudden drop or sudden rise of requests. Human tenants have different number of requests of day depending on the time of the day (more in day and less in night) and day of the week (more on weekdays and less on weekends). The service owner wants to detect when such human tenants have a relative drop or rise in a number of requests. The above combination-based technique is applied to all the time series (requests) per tenant. Input time series are referred to as raw time series.

First, if the historical part of the raw time series is almost zero, apply the zero threshold technique to detect when the number of requests goes more than 100. This will take care of all the new tenants. Next, if the standard deviation of the historical part of the raw time series is around zero, apply change in average percent based technique to detect a sudden drop or rise in a number of requests. This will take care of all the automated tenants. Next, remove seasonal and trend component from the raw time series, leaving the residual signal. Then apply the standard deviation based technique to detect a drop or rise in a number of requests in these residual signal. Because removing the seasonal and trend components makes the time series independent of time of day or day of week, the actual drop or rise in requests can be detected. This takes care of all the time series from the human tenants. So, one combination of techniques is applied in this scenario to detect anomalies in different types of time series.

It is very inefficient and sometimes not possible based on time limitations of the system to analyze billions of time series. This can happen when say there are three dimensions (D1, D2 and D3, with 1000 values each), which means there are 1 billion (thousand times thousand times thousand) time-series. Accordingly, in an embodiment, anomaly detection may begin on a reduced set of the total number of dimensions, such as just D1 in this example. The number of anomalies may be significantly less than thousand. Then, anomalies are searched for in the time series that have anomalous dimension values for the D1 dimension (dimension values of D1 where an anomaly is detected) and all dimensions values an additional dimension, such as D2. The detected anomalies may number significantly less than a million (thousand times thousand). Then, anomalies are searched for in time series which have anomalous dimension values from D1 and D2, and all dimension values for an additional dimension, such as D3. This way, at any point of time, a relatively small number of time series compared to the total possible number of time series (e.g., 1 billion time-series) is analyzed even when the total number of time series to analyze is a billion.

Furthermore, at any process step, more than one dimension can be combined. For example, say D2 and D3 had 100 values each. At the second process step, anomalies may be searched for in the time series having anomalous D2 dimension values and all D2 and D3 dimension values. Zooming into dimensions to detect anomalies in high cardinality dimensions may be used. For example, a distributed service may serve ten thousand applications, each application can be used by millions of tenants, and each tenant can have ten thousand users. To monitor requests for the dimension of applications, tenants, and users, anomalies may first be detected on the application dimension. Then, the anomalous applications are chosen, and anomalies are detected in requests coming from different tenants. Then, users in the anomalous tenant using the anomalous applications may be analyzed for anomalies. In this manner, the anomaly is honed in on specific combinations of application, tenant, and user, enabling the anomaly to be more easily addressed.

B. Exemplary Anomaly Detection Techniques and Selection Thereof

As described above, embodiments are applicable to any technique for detecting anomalies in time series data. The zero-threshold detection technique, average percent detection technique, and standard deviation detection technique are examples of detection techniques. For a particular set of time series data, one of those (and/or other available detection techniques) may be selected for detecting anomalies, depending on attributes of the time series data.

For instance, FIG. 5 shows an example plot 500 of time-series data to which the zero-threshold technique may be selected for application by anomaly detector 206. As shown in FIG. 5, a first portion 502 (e.g., historical time-series data) of the time-series plot has an average value of approximately zero and standard deviation of approximately zero. Accordingly, during step 302 of flowchart 300, detection technique selector 402 would select the zero-threshold technique for anomaly detector 206 to apply to the time-series data in a second portion 504 (e.g., current time series-data) for detecting anomalies over the average percent and standard deviation detection techniques. In applying the zero-threshold technique, anomaly detector 206 determines if data points in second portion 504 have values with a predetermined relationship (e.g., equal to or greater than) with a predetermined threshold. As described herein, the predetermined threshold may be determined automatically by tuner 208 and/or detection technique selector 204 of FIG. 2, or set by a user interacting with interface 110 of FIG. 1. With respect to plot 500, if the predetermined threshold is a value of 200, an anomaly would be detected at one or more data points in a time range 506 in the plotted time-series data set. This is because at least some data points in time range 506 have values greater than 200.

FIG. 6 shows an example plot 600 of time-series data to which the average percent technique may be selected for application by anomaly detector 206. As shown in FIG. 6, a first portion 602 (e.g., historical time-series data) of the time-series plot has an average value greater than zero (a value slightly below 100) and a standard deviation of approximately zero. Accordingly, during step 302 of flowchart 300, detection technique selector 402 would select the average percent technique for anomaly detector 206 to apply to the time-series data for detecting anomalies over the zero-threshold and standard deviation detection techniques. In applying the average percent technique, anomaly detector 206 determines if data points in a second portion 604 (current time series data) have values that differ from the time series average value (determined for the historical data of first portion 602) by a predetermined percentage change value. As described herein, the predetermined percentage change value may be determined automatically by tuner 208 and/or detection technique selector 204 of FIG. 2, or set by a user interacting with interface 110 of FIG. 1. If a data point has a value that differs from the determined time series average value by a predetermined percentage change value, such as a value of 100%, the data point is considered an anomaly. In FIG. 6, an anomaly is detected for data points in time range 606, because the percentage change of those data point values is an approximately 200% increase over the average value, which is greater than the selected threshold value of 100%.

FIG. 7 shows an example plot 700 of time-series data to which the standard deviation technique may be selected for application by anomaly detector 206. As shown in FIG. 7, a first portion 702 (e.g., historical time-series data) of the time-series plot has a standard deviation substantially greater than zero. Accordingly, during step 302 of flowchart 300, detection technique selector 402 would select the standard deviation technique for anomaly detector 206 to apply to the time-series data for detecting anomalies over the zero-threshold and average percent detection techniques. In applying the standard deviation technique, anomaly detector 206 determines the standard deviation of first portion 702 of the time-series (e.g., historical time series data) as a historical standard deviation. Anomaly detector 206 compares a standard deviation of each data point of a second portion 704 of the time-series (current time-series data) to the historical standard deviation. If the standard deviation of a data point differs from the historical standard deviation by a predetermined standard deviation threshold value, an anomaly is detected for the data value. In FIG. 7, an anomaly is detected for data points in time range 706, because the standard deviations of those data point values are substantially greater than the historical standard deviation of first portion 702.

C. Exemplary Time Series Data Filtering

Note that in an embodiment, prior to analyzing time-series data for anomalies, the time-series data may be pre-filtered to enable easier analysis, such as by filtering out seasonality and/or trend characteristics from the time-series data. As described above, time-series data filter 404 may perform the pre-filtering of time-series data. Additionally, or alternatively, anomaly detector 206 may perform the pre-filtering.

FIG. 8 depicts a flowchart 800 of a method for removing seasonality and trend data from time-series data, according to an example embodiment. In an embodiment, time-series data filter 404 and/or anomaly detector 206 may perform flowchart 800. FIG. 8 is described with continued reference to FIGS. 1, 2, and 4. However, other structural and operational embodiments will be apparent to persons skilled in the relevant art(s) based on the following discussion regarding flowchart 800 and systems 100, 200, and 400 of FIGS. 1, 2, and 4.

As shown in FIG. 8, flowchart 800 begins at step 802. In step 802, seasonality and trend data is removed from time-series data. For example, time-series data filter 404 and/or anomaly detector 206 may remove seasonality and trend data from time-series data 118 to generate a residual version of time-series data 118. For instance, this may be performed prior to the standard deviation detection technique (and/or other detection technique) being performed on time-series data 118, because the seasonality and/or trend attributes of time-series data 118 may appear as standard deviation, which is undesired and may interfere with anomaly detection. In such an embodiment, the standard deviation detection technique may be applied to the residual version of the time-series data (having had trend and seasonal removed).

To further help illustrate flowchart 800, FIG. 9 illustrates a plot diagram 900 that includes an example of the seasonal and trend decomposition of a time-series signal. As shown in FIG. 9, plot diagram 900 includes first-fourth plots 910, 912, 914, and 916 that respectively include first-fourth time-series 902, 904, 906, and 908, plotted against a common timeline. Time-series 902 in plot 910 is a composite time series that may have been measured in the real world, and thus may contain seasonal, trend, and residual data components. As such, the data point values of time-series 902 may each be composed of seasonal information, trend information, and residual information.

In particular, seasonality is a variation in a time series that varies at regular intervals over the course of a year, such as on a daily, weekly, monthly or yearly basis. Seasonality contributes to the seasonal information in time-series 902. Time series 904 in plot 912 is the seasonal component of time series 902. Time-series data filter 404 and/or anomaly detector 206 may be configured to filter out the seasonal component from time-series 902.

Trend is the general direction of a time series over longer time periods than seasonality (e.g. trending upwards or downwards). Trend contributes to the trend information in time-series 902. Time series 906 in plot 914 is the trend component of time series 902. Time-series data filter 404 and/or anomaly detector 206 may be configured to filter out the trend component from time-series 902.

A time series may either be an additive or multiplicative composition of seasonal, trend, and residual components. A residual signal remains after the seasonality and trend are filtered out. In the example of FIG. 9, time series 908 is the residual time series after seasonality (time series 904) and trend (time series 906) are filtered from time series 902. In an embodiment, for anomaly detection performed by anomaly detector 206 using the standard deviation technique, time-series data filter 404 and/or anomaly detector 206 may be used to filter out the seasonality and trend components from the received time series for both the historical time series and the current time series, and the residual historical time series and residual current time series may be compared by anomaly detector 206 to detect an anomaly (e.g., if differing by more than a predetermined standard deviation threshold value, as described further above).

In one example, a number of service requests to a service coming from different users can form a time series. Most likely, there are more service requests on a weekday than on a weekend. Also, more service requests may be made during the day than at night. Both weekly and daily cycles can be considered seasonal data, and therefore can be removed from the time-series data by time-series filter 404. Similarly, if the number of service requests gradually increases over time, this trend data may be removed from the time-series data by time-series filter 404, resulting in a residual signal.

D. Iterative Anomaly Detection Embodiments

As described above, the process of increasing the number of dimensions (step 306 of FIG. 3) and applying the selected detection technique to the time series with the increased number of dimensions (step 308 of FIG. 3) can be iterated. For instance, FIG. 10 depicts a flowchart 1000 of a method for iteratively applying a selected detection technique to re-detect an anomaly with increasing granularity of focus, according to an example embodiment. FIG. 10 is described with continued reference to FIGS. 1, 2, and 4. However, other structural and operational embodiments will be apparent to persons skilled in the relevant art(s) based on the following discussion regarding flowchart 300 and systems 100, 200, and 400 of FIGS. 1, 2, and 4.

As shown in FIG. 10, flowchart 1000 begins at step 1002. In step 1002, the selected detection technique is iteratively applied to the time-series data for further sets of dimensions of the time-series data to iteratively re-detect the anomaly. For example, and with continued reference to FIGS. 1, 2, and 4, iterator 408 may be configured to iteratively apply the selected detection technique (of step 302 of FIG. 3) to the time-series data for further dimensions of the time-series data to iteratively re-detect the anomaly. According to this iterative approach, a source and/or location of an anomaly may be increasingly honed in upon, which may aid in problem/issue resolution. Note that in an alternative embodiment, the particular detection technique to be applied to the time-series data at each iteration of step 1002 may be selected for that iteration according to step 302 of flowchart 300. As such, in an alternative embodiment to step 1002 (and to step 308 of flowchart 308), for each iteration of detecting anomalies for a time-series, a detection technique may be selected from the available detection techniques and applied to the time series data for the particular dimension set (e.g., increased number of dimensions, decreased number of dimensions, and/or other arrangement of dimensions).

An example provided further above is described here as an illustration of the iterative approach. In particular, an anomaly detection technique may be selected to detect an anomaly in a time-series corresponding to dimension values of A1E1, where the Application dimension has values of A1, A2, and the Error Code dimension has values of E1, E2, E3. In response, the dimension set may be limited to the dimension value combination of A1E1 for the Application and Error Code dimensions, and an additional dimension of "Tenant" (consisting of a hundred tenants from T1 to T100) may be selected to be included in the set of dimensions. The selected detection technique may be re-applied to the time-series data corresponding to each combination of dimension values for this set of dimensions, which includes A1E1T1, A1E1T2 . . . A1E1T100 (100 time series), to redetect the anomaly. In this example, the anomaly may be detected for dimension value combination of A1E1T7, which reveals that Application A1 is suffering Error Code E1 an unusually high number of times with respect to Tenant T7 at the particular time instance of the anomaly. This more precise detection enables the problem leading to Error Code E1 in Application A1 to be investigated at Tenant T7. Furthermore, this problem is localized to A1E1T7 by analyzing 106 time series for anomalies, rather than analyzing all 600 time series for all combinations of Application, Error Code, and Tenant.

Figure 11:
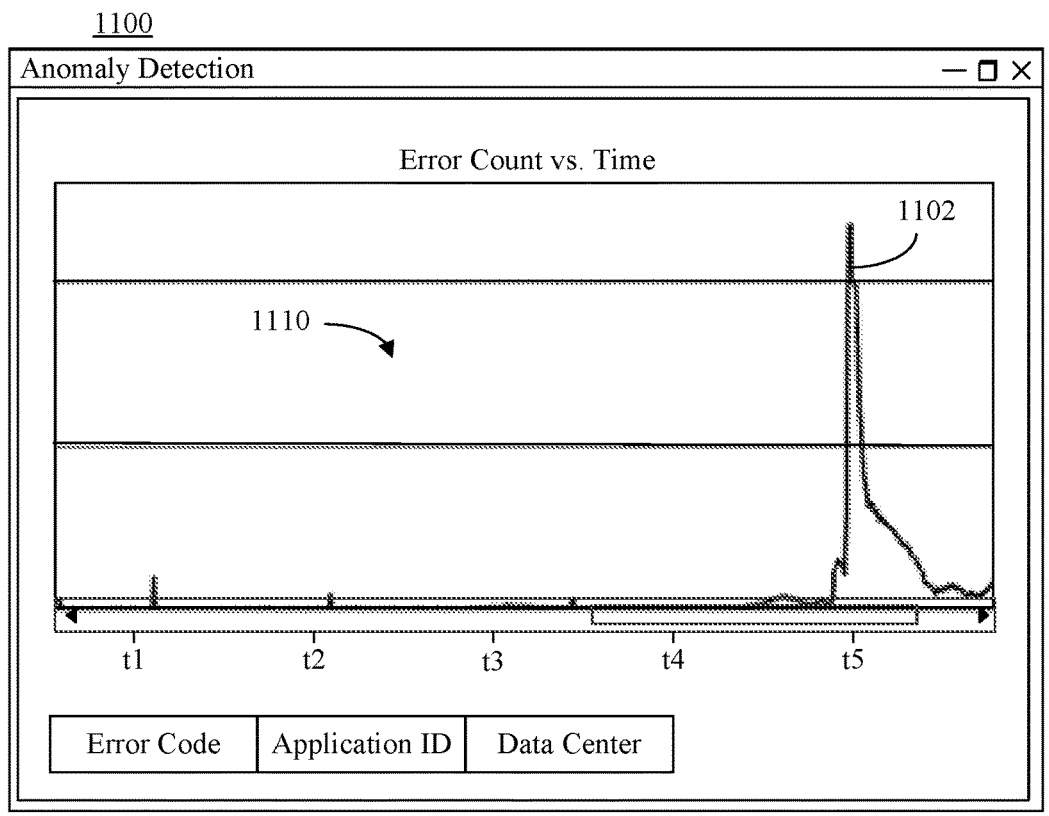
FIG. 11 depicts an example indication of an anomaly in a plot of a time-series data set, in accordance with an embodiment.
Figure 12:
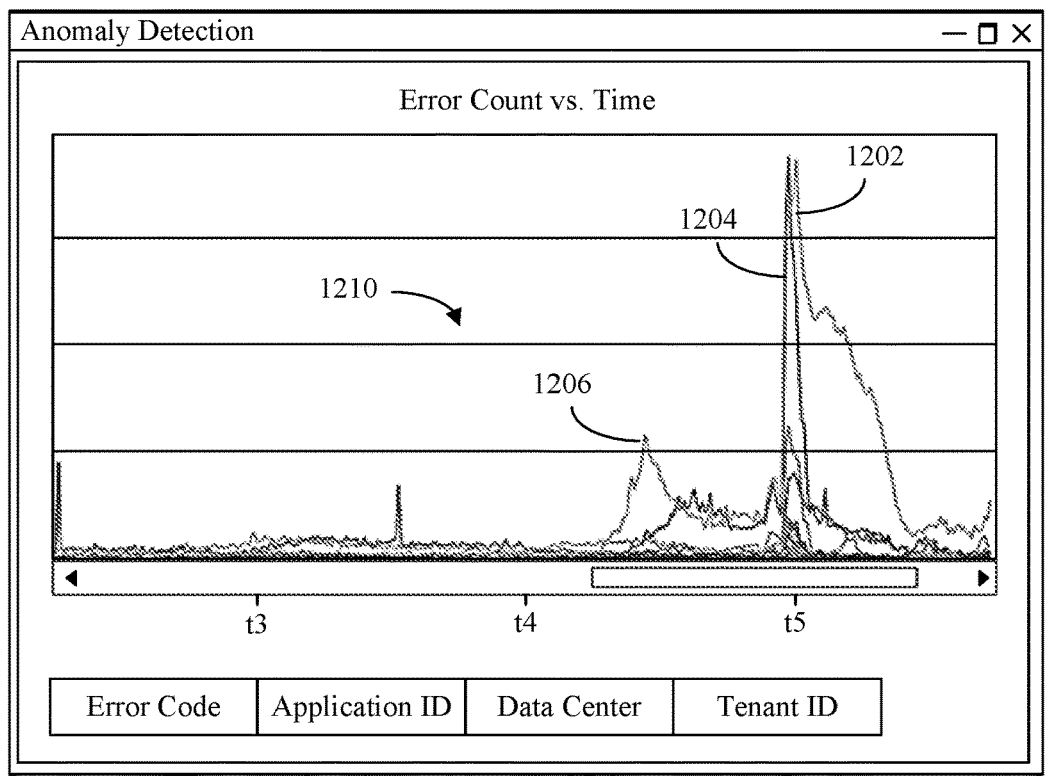
FIG. 12 depicts an example indication of an anomaly in a plot of multiple time-series data sets, in accordance with an embodiment.

FIGS. 11 and 12 depict an example anomaly in plots of time-series data sets, in accordance with an embodiment. In FIGS. 11 and 12, a user interface 1100 is shown that each displays plots of time series data representing an error count. An anomaly is present in the time series data in each case (e.g., abnormally high error count), which may be detected by anomaly detector 206. Anomaly detection system interface 110 may have the form of user interface 1100 in an embodiment.

In particular, FIG. 11 shows an anomaly 1102 detected in first times-series 1110 by anomaly detector 206, and thus displayed to the user in user interface 1100. In FIG. 11, anomaly 1102 in error count is indicated at time t5 as a spike for a particular combination of dimension values for a set of dimensions including "Error Code", "Application ID", and "Data Center." In an embodiment, anomaly 1102 may have been detected by performing steps 302 and 304 of flowchart 300 (FIG. 3). The user may desire to explore anomaly 1102 at a higher degree of granularity with respect to these dimensions in order to hone in on the problem of elevated error count.

For example, as shown in FIG. 12, the user may have selected an additional dimension of "Tenant ID" to include in the set of dimensions for re-detection of anomaly 1102. Anomaly detector 206 may perform anomaly detection as described herein to detect anomaly 1102 in one or more time series in the form of one or more anomalies. For instance, as shown in FIG. 12, user interface 1100 displays a plot of several time-series data sets overlaid over each other as multiple time series 1210. Each time series of multiple time series 1210 is displayed either because the user elected to display all of the time series for the Tenant ID dimension for the combination of dimension values of Error Code, Application ID, and Data Center dimensions where anomaly 1102 was detected. Alternatively, multiple time series 1210 may be displayed due to anomaly detector 206 detecting anomalies in each of the time series thereof. In other words, steps 306 and 308 of flowchart 300 (FIG. 3) may be performed to detect anomalies across the Tenant ID dimension, and the time series in which anomalies are detected may be displayed in plot 110 of FIG. 12 (time series in which anomalies were not detected may not be displayed). In either case, the user may view user interface 1100 of FIG. 12 to see where anomalies are present. For instance, first-third anomalies 1202, 1204, and 1206 are shown (anomaly 1206 may or may not have been flagged as an anomaly, depending on the configuration of anomaly detector 206). As shown in FIG. 12, anomalies 1202 and 1204 correspond to anomaly 1102 of FIG. 11, and thus show more granular information for anomaly 1102. In particular, the user may determine which tenants were impacted by anomaly 1102 detected at time t5 in FIG. 11, by determining the tenants corresponding to the time series containing anomalies 1202 and 1204 in FIG. 12.

E. Exemplary User Interfaces for Configuring Anomaly Detection

Figure 13:
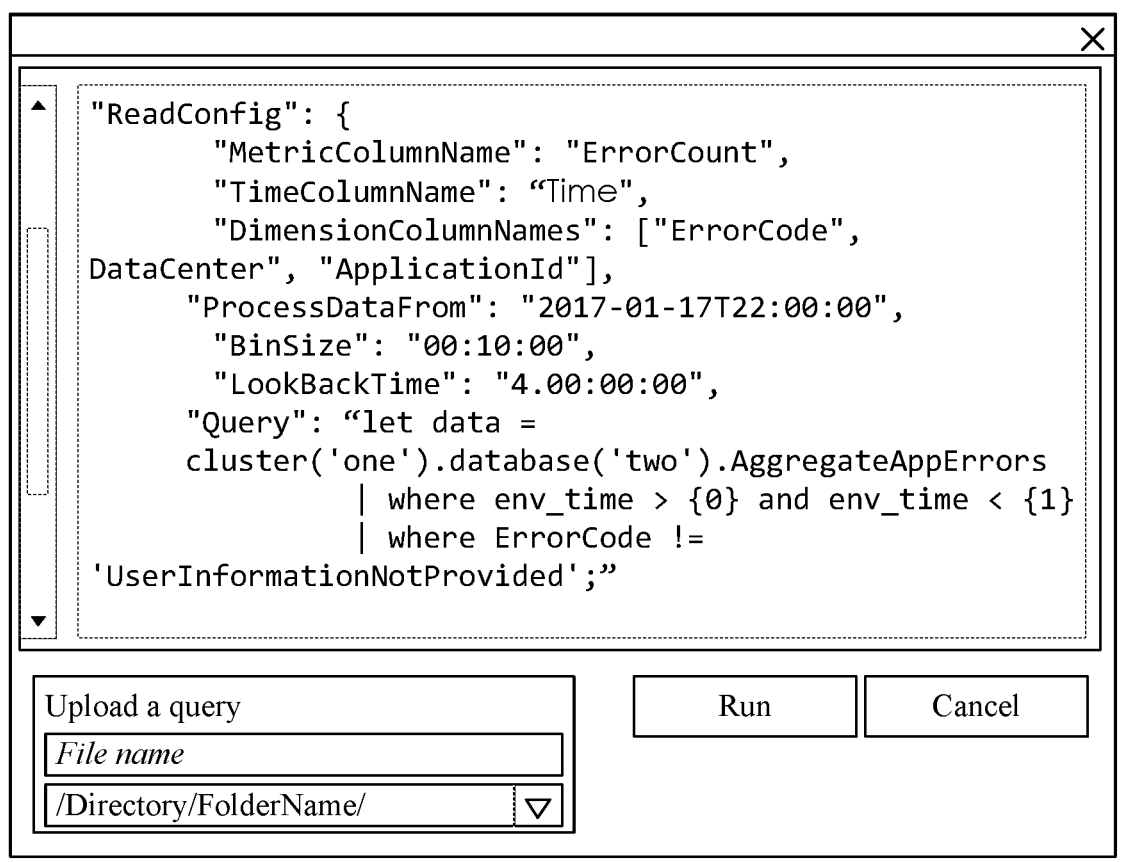
FIG. 13 depicts an example user programmatic interface enabling a user to query and filter time-series data, in accordance with an embodiment.

FIG. 13 depicts an example user programmatic interface 1300 enabling a user to query and filter time-series data. User programmable interface 1300 is an example of anomaly detection system interface 110 of FIG. 1. In an embodiment, user 112 of FIG. 1 may interact with user programmatic interface 1300 to configure anomaly detection, as well as to analyze time-series data. For example, as shown in FIG. 13, a query may be configured to analyze a particular metric (e.g., "ErrorCount") for a service over periods of time, as indicated by parameters "MetricColumnName" and "TimeColumnName." Furthermore, tuning information may be submitted by a user to tuner 208 to tune anomaly detection by anomaly detection system 104.

For example, by interacting with user programmatic interface 1300, a user may be enabled to select the dimensions to be included in the analysis through parameter "DimensionColumnNames". In addition, the user may identify and/or tune a "BinSize," which determines at what units of time (e.g., every minute, every second) the metric values are provided and identify and/or tune a "LookBackTime" that identifies the period of historical data to be used in detecting an anomaly.

The user may also be able to filter data by interacting with user programmatic interface 1300. For example, as shown in FIG. 13, the user may indicate which databases to search and which "ErrorCode" to filter out.

User programmable interface 1300 may be configured in various ways to enable a user to configure and/or tune such parameters of anomaly detection. For instance, in the embodiment of FIG. 13, the user may input/modify parameters in the form of code. In another embodiment, the user may interact with one or more graphical user interface controls to input/modify parameters, such as pulldown menus, slider bars, check boxes, text input boxes, etc.

III. Example Computer System Implementations

Any of the components of systems 100, 200, and 400 and any of the steps of the flowcharts of FIGS. 3, 8, and 10 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
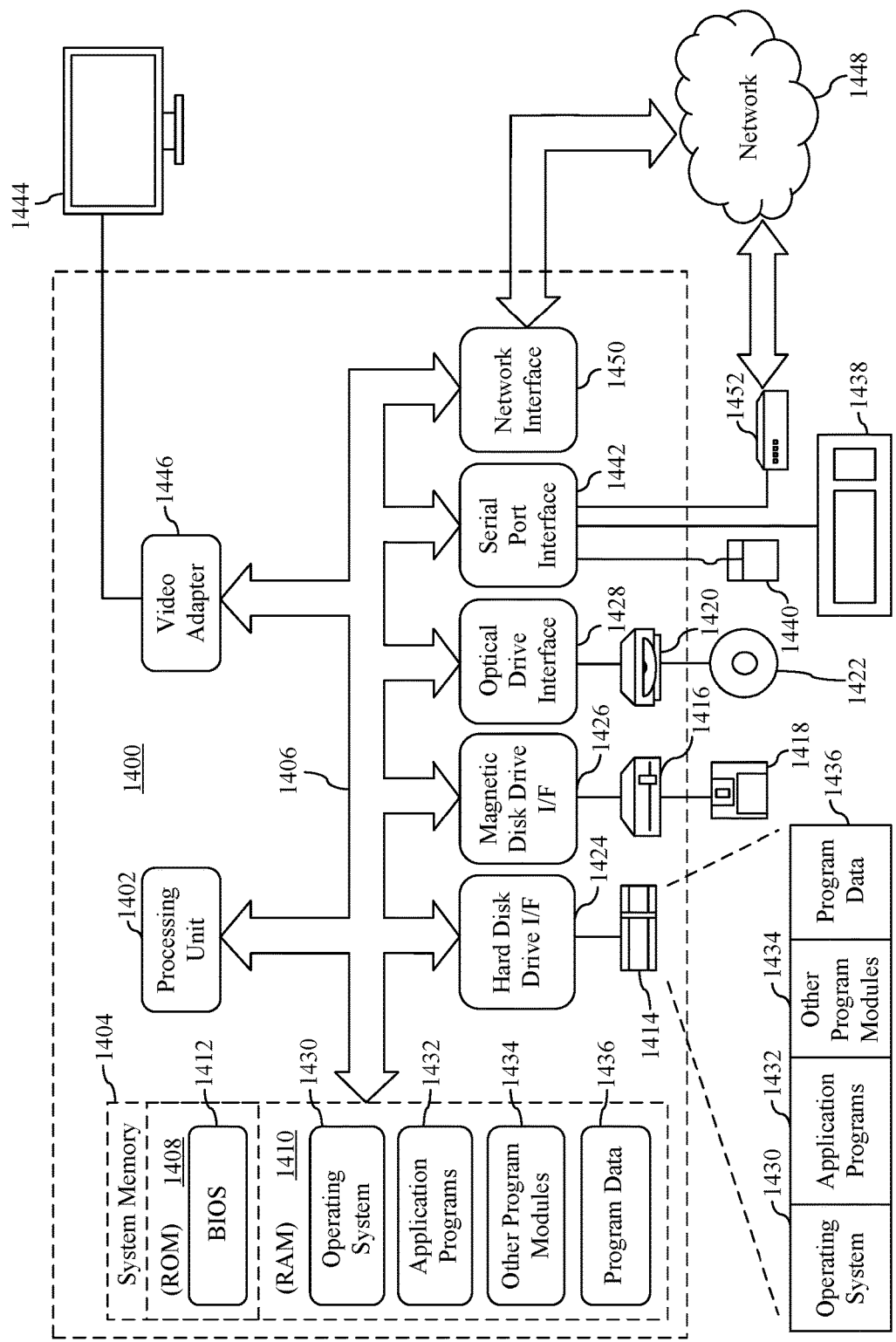
FIG. 14 is a block diagram of an example processor-based computer system that may be used to implement various embodiments.

FIG. 14 depicts an example processor-based computer system 1400 that may be used to implement various embodiments described herein, such as any of the embodiments described in the Sections above and in reference to FIGS. 1-13. For example, processor-based computer system 1400 may be used to implement any of the components of systems 100, 200, and 400, as described above in reference to FIGS. 1, 2, and 4 as well as any of the flowcharts described above in reference to FIGS. 3, 8, and 10. The description of system 1400 provided herein is provided for purposes of illustration, and is not intended to be limiting. Embodiments may be implemented in further types of computer systems, as would be known to persons skilled in the relevant art(s).

As shown in FIG. 14, system 1400 includes a processing unit 1402, a system memory 1404, and a bus 1406 that couples various system components including system memory 1404 to processing unit 1402. Processing unit 1402 may comprise one or more hardware-implemented microprocessors or microprocessor cores. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

System 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, BLU-RAY™ disk or other optical media. Hard disk drive 1414, magnetic disk drive 1416, and optical disk drive 1420 are connected to bus 1406 by a hard disk drive interface 1424, a magnetic disk drive interface 1426, and an optical drive interface 14214, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives (SSDs), flash memory cards, digital video disks, random access memories (RAMs), read only memories (ROM), and the like.

A number of program modules may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to implement any of the embodiments described in the Sections above and in reference to FIGS. 1-13. For example, the program modules may include computer program logic that is executable by processing unit 1402 to implement any of the components of systems 100, 200, and 400 as described above in reference to FIGS. 1, 2, and 4 as well as any of the flowcharts described above in reference to FIGS. 3, 8, and 10.

A user may enter commands and information into system 1400 through input devices such as a keyboard 1438 and a pointing device 1440 (e.g., a mouse). Other input devices (not shown) may include a microphone, joystick, game controller, scanner, or the like. In one embodiment, a touch screen is provided in conjunction with a display 1444 to allow a user to provide user input via the application of a touch (as by a finger or stylus for example) to one or more points on the touch screen. These and other input devices are often connected to processing unit 1402 through a serial port interface 1442 that is coupled to bus 1406, but may be connected by other interfaces, such as a parallel port, game port, or a universal serial bus (USB). Such interfaces may be wired or wireless interfaces.

Display 1444 is connected to bus 1406 via an interface, such as a video adapter 1446. In addition to display 1444, system 1400 may include other peripheral output devices (not shown) such as speakers and printers.

System 1400 is connected to a network 1448 (e.g., a local area network or wide area network such as the Internet) through a network interface 1450, a modem 1452, or other suitable means for establishing communications over the network. Modem 1452, which may be internal or external, is connected to bus 1406 via serial port interface 1442. System 1400 may include multiple network interfaces.

As used herein, the terms "computer program medium," "computer-readable medium," and "computer-readable storage medium" are used to generally refer to memory devices or storage structures such as the hard disk associated with hard disk drive 1414, removable magnetic disk 1418, removable optical disk 1422, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable system 1400 to implement features of embodiments discussed herein. Accordingly, such computer programs represent controllers of the system 1400.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IV. Additional Example Embodiments

In an embodiment, a system comprises: a detection technique selector configured to receive time-series data and to select from a plurality of detection techniques a detection technique for detecting anomalies in a first-time-series data set for a combination of values of a first set of dimensions of the time-series data; and an anomaly detector configured to first apply the selected detection technique to the first time-series data set, to detect an anomaly in the first time-series data set, and to second apply the selected detection technique to a second time-series data set for a combination of values of a second set of dimensions of the time-series data in response to detecting the anomaly in the first time-series data set, wherein the first set of dimensions is a subset of the second set of dimensions and the second set of dimensions includes an additional dimension.

In an embodiment of the foregoing system further comprises a tuner configured to adjust sensitivity of the anomaly detector to detect anomalies based on the anomaly detected.

In an embodiment of the foregoing system, the anomaly detector is further configured to iteratively apply the selected detection technique to additional time-series data sets for other combinations of values of the second set of dimensions of the time-series data in response to detecting an anomaly in the first-time-series data set.

In an embodiment of the foregoing system, said second apply the selected detection technique comprises detecting an anomaly in the second time-series data set; and the anomaly detector is further configured to apply the selected detection technique to a third time-series data set for a combination of values of a third set of dimensions of the time-series data in response to detecting an anomaly in the second time-series data set, wherein the second set of dimensions is a subset of the third set of dimensions and the third set of dimensions includes an additional dimension not included in the second set of dimensions.

In an embodiment of the foregoing system, the selected detection technique is a zero-threshold technique and wherein said first apply comprises detecting the anomaly in the first-time-series data set based on a threshold.

In an embodiment of the foregoing system, the selected detection technique is an average percent technique and wherein said first apply comprises detecting the anomaly in the first-time-series data set based on a change in an average percentage.

In an embodiment of the foregoing system, wherein the detection technique selector is further configured to enable a user to select whether to remove seasonality and trend data from the first time-series data set.

In an embodiment of the foregoing system, the selected detection technique is a standard deviation technique and wherein said first apply comprises detecting the anomaly in the first-time-series data set based on a normal distribution of historical data.

In another embodiment, a method comprises: selecting from a plurality of detection techniques a detection technique configured to detect anomalies in time-series data that includes a series of data points captured over time for multiple dimensions; applying the selected detection technique to the time-series data set for a first set of dimensions to detect an anomaly; selecting an additional dimension to include in the first set of dimensions to generate a second set of dimensions; and applying the selected detection technique to the time-series data for the second set of dimensions to re-detect the anomaly.

In an embodiment, the foregoing method further comprises: iteratively applying the selected detection technique to the time-series data for further sets of dimensions of the time-series data to iteratively re-detect the anomaly.

In an embodiment of the foregoing method, said applying the selected detection technique to the time-series data set for a first set of dimensions to detect an anomaly comprises: detecting the anomaly at a first coordinate value set for the first set of dimensions; and wherein said applying the selected detection technique to the time-series data for the second set of dimensions to re-detect the anomaly comprises: detecting the anomaly at a second coordinate value set for the second set of dimensions, the second coordinate value set including the first coordinate value set for the first set of dimensions and a coordinate value for the additional dimension.

In an embodiment of the foregoing method, the selected detection technique is a zero-threshold technique and wherein said applying the selected detection technique to the time-series data set for a first set of dimensions to detect an anomaly comprises: detecting the anomaly in the time-series data at a time value having an associated data value greater than a threshold value.

In an embodiment of the foregoing method, the selected detection technique is an average percent technique and wherein said applying the selected detection technique to the time-series data set for a first set of dimensions to detect an anomaly comprises: detecting the anomaly in the time-series data at a time value having an associated data value greater than an average percentage.

In an embodiment of the foregoing method, said applying the selected detection technique to the time-series data set for a first set of dimensions to detect an anomaly comprises: enabling a user to select whether to remove seasonality and trend data from the time-series data; and applying the selected detection technique to the time-series data set with seasonality and trend removed according to selection by the user.

In an embodiment of the foregoing method, the selected detection technique is a standard deviation technique and wherein said applying the selected detection technique to the time-series data set for a first set of dimensions to detect an anomaly comprises: detecting the anomaly in the time-series data at a time value having an associated data value that is beyond a predetermined value with reference to a normal distribution of historical data.

In another embodiment, a computer-readable storage medium having program instructions recorded thereon that, when executed by at least one processing circuit of a computing device, perform a method, comprises: receiving time-series data; selecting from a plurality of detection techniques a detection technique for detecting anomalies in a first-time-series data set for a combination of values of a first set of dimensions of the time-series data; first applying the selected detection technique to the first time-series data set; and in response to detecting an anomaly in the first time-series data set, second applying the selected detection technique to a second time-series data set for a combination of values of a second set of dimensions of the time-series data, wherein the first set of dimensions is a subset of the second set of dimensions and the second set of dimensions includes an additional dimension.

In an embodiment of the foregoing method comprises: iteratively applying the selected detection technique to additional time-series data sets for other combinations of values of the second set of dimensions of the time-series data in response to detecting an anomaly in the first-time-series data set.

In an embodiment, said second applying the selected detection technique comprises detecting an anomaly in the second time-series data set and the method further comprises: applying the selected detection technique to a third time-series data set for a combination of values of a third set of dimensions of the time-series data in response to detecting an anomaly in the second time-series data set, wherein the second set of dimensions is a subset of the third set of dimensions and the third set of dimensions includes an additional dimension not included in the second set of dimensions.

In an embodiment, the foregoing method comprises: removing seasonality and trend data from the first time-series data set.

In an embodiment, the selected detection technique is a standard deviation technique and wherein said first applying comprises detecting the anomaly in the first-time-series data set based on a normal distribution of historical data.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system, comprising:
one or more processors;
one or more memory devices that store computer program logic for execution by the one or more processors, the computer program logic comprising:
  a detection technique selector configured to receive time-series data and to select, based on characteristics of historical data, from a plurality of detection techniques a detection technique for detecting anomalies in a first-time-series data set for a combination of values of a first set of dimensions of the time-series data, each dimension in the first set of dimensions corresponding to an attribute of the time-series data; and
  an anomaly detector configured to first apply the selected detection technique to the first time-series data set, to detect an anomaly in the first time-series data set, and to second apply the selected detection technique to a second time-series data set for a combination of values of a second set of dimensions of the time-series data in response to detecting the anomaly in the first time-series data set, wherein the first set of dimensions is a subset of the second set of dimensions and the second set of dimensions includes an additional dimension corresponding to an additional attribute of the time-series data, and the dimensions of the first and second sets of dimensions represent a same metric over an interval of time.

2. The system of claim 1, the computer program logic further comprising a tuner configured to adjust sensitivity of the anomaly detector to detect anomalies based on the anomaly detected.

3. The system of claim 1, wherein the anomaly detector is further configured to iteratively apply the selected detection technique to additional time-series data sets for other combinations of values of the second set of dimensions of the time-series data in response to detecting an anomaly in the first-time-series data set.

4. The system of claim 1, wherein:
said second apply the selected detection technique comprises detecting an anomaly in the second time-series data set; and
the anomaly detector is further configured to apply the selected detection technique to a third time-series data set for a combination of values of a third set of dimensions of the time-series data in response to detecting an anomaly in the second time-series data set, wherein the second set of dimensions is a subset of the third set of dimensions and the third set of dimensions includes an additional dimension not included in the second set of dimensions.

5. The system of claim 1, wherein the selected detection technique is a zero-threshold technique and wherein said first apply comprises detecting the anomaly in the first-time-series data set based on a threshold.

6. The system of claim 1, wherein the selected detection technique is an average percent technique and wherein said first apply comprises detecting the anomaly in the first-time-series data set based on a change in an average percentage.

7. The system of claim 1, wherein the detection technique selector is further configured to enable a user to select whether to remove seasonality and trend data from the first time-series data set.

8. The system of claim 1, wherein the selected detection technique is a standard deviation technique and wherein said first apply comprises detecting the anomaly in the first-time-series data set based on a normal distribution of historical data.

9. A method, comprising:
selecting, based on characteristics of historical data, from a plurality of detection techniques a detection technique configured to detect anomalies in time-series data that includes a series of data points captured over time for multiple dimensions, each dimension of the multiple dimensions corresponding to an attribute of the time-series data;
applying the selected detection technique to the time-series data for a first set of dimensions to detect an anomaly;
selecting an additional dimension of the time-series data to include in the first set of dimensions to generate a second set of dimensions, the additional dimension corresponding to an additional attribute of the time-series data; and
applying the selected detection technique to the time-series data for the second set of dimensions to re-detect the anomaly.

10. The method of claim 9, further comprising:
iteratively applying the selected detection technique to the time-series data for further sets of dimensions of the time-series data to iteratively re-detect the anomaly.

11. A method, comprising:
selecting, from a plurality of detection techniques a detection technique configured to detect anomalies in time-series data that includes a series of data points captured over time for multiple dimensions;
applying the selected detection technique to the time-series data for a first set of dimensions to detect an anomaly;
selecting an additional dimension to include in the first set of dimensions to generate a second set of dimensions; and
applying the selected detection technique to the time-series data for the second set of dimensions to re-detect the anomaly, the applying comprising:
detecting the anomaly at a first coordinate value set for the first set of dimensions; and wherein said applying the selected detection technique to the time-series data for the second set of dimensions to re-detect the anomaly comprises:
detecting the anomaly at a second coordinate value set for the second set of dimensions, the second coordinate value set including the first coordinate value set for the first set of dimensions and a coordinate value for the additional dimension.

12. The method of claim 9, wherein the selected detection technique is a zero-threshold technique and wherein said applying the selected detection technique to the time-series data for a first set of dimensions to detect an anomaly comprises:
detecting the anomaly in the time-series data at a time value having an associated data value greater than a threshold value.

13. The method of claim 9, wherein the selected detection technique is an average percent technique and wherein said applying the selected detection technique to the time-series data for a first set of dimensions to detect an anomaly comprises:
detecting the anomaly in the time-series data at a time value having an associated data value greater than an average percentage.

14. A method, comprising:
selecting from a plurality of detection techniques a detection technique configured to detect anomalies in time-series data that includes a series of data points captured over time for multiple dimensions;
applying the selected detection technique to the time-series data for a first set of dimensions to detect an anomaly;
selecting an additional dimension to include in the first set of dimensions to generate a second set of dimensions; and
applying the selected detection technique to the time-series data for the second set of dimensions to re-detect the anomaly, the applying comprising:
enabling a user to select whether to remove seasonality and trend data from the time-series data; and
applying the selected detection technique to the time-series data with seasonality and trend removed according to selection by the user.

15. The method of claim 14, wherein the selected detection technique is a standard deviation technique and wherein said applying the selected detection technique to the time-series data for a first set of dimensions to detect an anomaly comprises:
detecting the anomaly in the time-series data at a time value having an associated data value that is beyond a predetermined value with reference to a normal distribution of historical data.

16. A computer-readable storage medium having program instructions recorded thereon that, when executed by at least one processing circuit of a computing device, perform a method, comprising:
receiving time-series data;
selecting, based on characteristics of historical data, from a plurality of detection techniques a detection technique for detecting anomalies in a first-time-series data set for a combination of values of a first set of dimensions of the time-series data, each dimension in the first set of dimensions corresponding to an attribute of the time-series data;
first applying the selected detection technique to the first time-series data set; and
in response to detecting an anomaly in the first time-series data set, second applying the selected detection technique to a second time-series data set for a combination of values of a second set of dimensions of the time-series data, wherein the first set of dimensions is a subset of the second set of dimensions and the second set of dimensions includes an additional dimension corresponding to an additional attribute of the time-series data, and the dimensions of the first and second sets of dimensions represent a same metric over an interval of time.

17. The computer-readable storage medium of claim 16, wherein the method further comprises:
iteratively applying the selected detection technique to additional time-series data sets for other combinations of values of the second set of dimensions of the time-series data in response to detecting an anomaly in the first-time-series data set.

18. The computer-readable storage medium of claim 16, wherein said second applying the selected detection technique comprises detecting an anomaly in the second time-series data set and the method further comprises:

applying the selected detection technique to a third time-series data set for a combination of values of a third set of dimensions of the time-series data in response to detecting an anomaly in the second time-series data set, wherein the second set of dimensions is a subset of the third set of dimensions and the third set of dimensions includes an additional dimension not included in the second set of dimensions.

19. The computer-readable storage medium of claim 16, wherein the method further comprises:

removing seasonality and trend data from the first time-series data set.

20. The computer-readable storage medium of claim 16, wherein the selected detection technique is a standard deviation technique and wherein said first applying comprises detecting the anomaly in the first-time-series data set based on a normal distribution of historical data.

\* \* \* \* \*